US009117565B2

(12) United States Patent
Chen et al.

(10) Patent No.: US 9,117,565 B2
(45) Date of Patent: Aug. 25, 2015

(54) MAGNETIC GRAIN BOUNDARY ENGINEERED FERRITE CORE MATERIALS

(75) Inventors: Yajie Chen, Malden, MA (US); Vincent G. Harris, Sharon, MA (US)

(73) Assignee: Metamagnetics, Inc., Sharon, MA (US)

( * ) Notice: Subject to any disclaimer, the term of this patent is extended or adjusted under 35 U.S.C. 154(b) by 121 days.

(21) Appl. No.: 13/466,751

(22) Filed: May 8, 2012

(65) Prior Publication Data

US 2012/0286920 A1 Nov. 15, 2012

Related U.S. Application Data

(60) Provisional application No. 61/483,922, filed on May 9, 2011.

(51) Int. Cl.

| | |
|---|---|
| ***H01B 1/20*** | (2006.01) |
| ***C08K 7/16*** | (2006.01) |
| ***C08K 3/08*** | (2006.01) |
| ***H01B 3/10*** | (2006.01) |

(52) U.S. Cl.
CPC ........................................ *H01B 3/10* (2013.01)

(58) Field of Classification Search
USPC .......................................... 252/62, 56, 62.62
See application file for complete search history.

(56) References Cited

U.S. PATENT DOCUMENTS

| | | | |
|---|---|---|---|
| 5,120,366 | A | 6/1992 | Harada |
| 5,905,472 | A | 5/1999 | Wolfson et al. |
| 5,955,998 | A | 9/1999 | Roberts et al. |
| 6,309,558 | B1 | 10/2001 | Kinoshita et al. |
| 6,772,147 | B2 | 8/2004 | Wang |
| 6,842,140 | B2 | 1/2005 | Killen et al. |
| 7,592,957 | B2 | 9/2009 | Achour et al. |
| 7,847,739 | B2 | 12/2010 | Achour et al. |
| 7,855,696 | B2 | 12/2010 | Gummalla et al. |
| 2002/0132136 | A1 | 9/2002 | Roshen |
| 2003/0163443 | A1 | 8/2003 | Wang |

(Continued)

FOREIGN PATENT DOCUMENTS

| | | |
|---|---|---|
| EP | 2228808 | 9/2010 |
| JP | 2004-021739 | 1/1992 |

(Continued)

OTHER PUBLICATIONS

Translation of JP 2003-309008, Oct. 31, 2003.*

(Continued)

*Primary Examiner* — Carol M Koslow

(74) *Attorney, Agent, or Firm* — Sean D. Detweiler, Esq.; Morse, Barnes-Brown & Pendleton, P.C.

(57) ABSTRACT

A composite material can include a grain component and a nanostructured grain boundary component. The nanostructured grain boundary component can be insulating and magnetic, so as to provide greater continuity of magnetization of the composite material. The grain component can have an average grain size of about 0.5-50 micrometers. The grain boundary component can have an average grain size of about 1-100 nanometers. The nanostructured magnetic grain boundary material has a magnetic flux density of at least about 250 mT. The grain component can comprise MnZn ferrite particles. The nanostructured grain boundary component can comprise NiZn ferrite nanoparticles. Core components and systems thereof can be manufactured from the composite material.

21 Claims, 16 Drawing Sheets

(56) References Cited

U.S. PATENT DOCUMENTS

| | | | |
|---|---|---|---|
| 2004/0189527 | A1 | 9/2004 | Killen et al. |
| 2007/0285324 | A1 | 12/2007 | Waterhouse et al. |
| 2008/0048917 | A1 | 2/2008 | Achour et al. |
| 2008/0258993 | A1 | 10/2008 | Gummalla et al. |
| 2009/0219213 | A1 | 9/2009 | Lee et al. |
| 2009/0295660 | A1 | 12/2009 | Xu et al. |
| 2009/0322637 | A1 | 12/2009 | Livingston et al. |
| 2010/0117908 | A2 | 5/2010 | Lee et al. |
| 2010/0261038 | A1 | 10/2010 | Imaoka et al. |
| 2011/0026624 | A1 | 2/2011 | Gummalla et al. |

FOREIGN PATENT DOCUMENTS

| | | |
|---|---|---|
| JP | 2003-151813 | 5/2003 |
| JP | 2003-297629 | 10/2003 |
| JP | 2003-309008 | * 10/2003 |
| JP | 2005-311078 | 11/2005 |
| WO | WO 2011/040126 | 4/2011 |

OTHER PUBLICATIONS

International Search Report for International Application PCT/US2012/40751, dated Jul. 18, 2012.

International Search Report for International Application PCT/US2012/36943, dated Jul. 18, 2012.

European Supplemental Search Report for EP Application 12782016, dated Apr. 30, 2015.

* cited by examiner 5 wt-%
nanoparticles 2 wt-%
nanoparticles 7 wt-%
nanoparticles

MAGNETIC GRAIN BOUNDARY ENGINEERED FERRITE CORE MATERIALS

RELATED APPLICATIONS

This application claims priority to, and the benefit of, U.S. Provisional Application No. 61/483,922, filed May 9, 2011, for all subject matter common to both applications. The disclosure of said provisional application is hereby incorporated by reference in its entirety.

FIELD OF THE INVENTION

The present invention relates materials to suitable for use as core components, for example in apparatuses utilizing switched mode power supplies and in other electronic devices and applications. More particularly, the present invention relates to a composite material having a nanostructured magnetic grain boundary material, which can be implemented for inductive core components.

BACKGROUND OF THE INVENTION

Inductive cores and core components are utilized in a vast number of electronic applications. One example implementation is switched mode power supply (SMPS), a common form of power supply that is utilized in a wide variety of electronic devices, as can be appreciated by one skilled in the art. Other applications include transformers, power converters, power generators, power conditioning components, and inductors, which for example can be used in Electronically Scanned Phased Arrays (ESPA) and Electronic Warfare (EW) systems, conditioning components for wireless and satellite communication, radar systems, power electronics, inductive devices, and systems, devices, or electronics utilizing switched-mode power supplies.

The example of SMPS can be useful in explaining some of the requirements and demands placed upon core components. Generally, SMPS involves the repeated switching of an input power supply between full-on and full-off. The rate of switching is measured as a frequency. Input power flowing through such a system can be changed in many ways in order to produce a particular desired output signal, as can be appreciated by one skilled in the art. For example, input power can be rectified, converted, cycloconverted, transformed, inverted, as well as many other changes in amplitude or phase associated with AC-to-AC power supplies, AC-to-DC power supplies, DC-to-DC power supplies, and DC-to-DC power supplies. All such changes can be controlled in specific manners to produce an output power level having particular desired voltage and/or current characteristics.

SMSP achieves greater efficiency over other competing power supplies, such as linear power supply, by capturing and storing energy in a "core." A core is a structural component (utilized in SMPS systems and also a wide range of other systems) that is made from magnetic material(s) and that can store energy generated by the system. Magnetic materials are used to make cores because they possess a high capacity for storing magnetic fields, a convenient and useable form of energy in such applications. Cores often are built from materials such as soft ferrites, since these materials exhibit high magnetization, low conductivity, and low coercivity (low remnant magnetization).

Continuing with the example of SMPS, higher switching frequencies in SMPS are associated with a number of known benefits, such as higher power efficiency. Increased switching frequencies also enable size reduction in SMPS systems, since smaller switching periods result in lower storage requirements. Said differently, a higher switching frequency results in a smaller amount of time during which a magnetic field is induced (i.e., stored) in the core, which causes the magnetic field in the core to be smaller, enabling the core itself to be reduced in size.

However, the maximum switching frequency is constrained by particular types of power losses in the core that become more noticeable at higher frequencies. In particular, as the operating frequency rises, power efficiency becomes highly dependent on "Eddy current losses" (i.e., losses due to the formation of Eddy currents within the core). Minimizing the presence and effects of Eddy currents typically becomes the most important factor in improving core characteristics, particularly for high frequency power ferrites. One known way to reduce core losses due to the appearance of Eddy currents in the ferrite material is to increase the resistivity of the core material, since resistivity restricts current flow in general, and restricts the flow of Eddy currents in particular. One skilled in the art can appreciate that by limiting the motion of electrons, Eddy currents become increasingly difficult to induce, thereby limiting the associated losses.

Accordingly, some attempts to limit Eddy current losses involve interspersing one or more highly resistive insulating materials at the grain boundaries of the grain material of the core, in order to prevent electron flow through the insulators and thus through the core. However, such attempts often fall short of providing cores that are capable of operating at extremely high frequencies (e.g., >1 MHz). Other efforts to reduce Eddy current losses involve implementing ferrite materials with high resistivity. These efforts suffer from a similar shortcoming of higher power losses at extremely high frequencies, as well as reduced overall permeability of the core material.

In many instances, the unsatisfactory performance at high frequencies is due to the fact that specification demands tend to place contradicting physical requirements upon cores. It is often difficult or impossible to optimize several magnetic properties simultaneously, due to the interdependency of the magnetic properties. Thus, improving one property may lead to the degradation of several others. As a result, existing core materials fail to satisfy the increasingly stringent high frequency requirements.

One skilled in the art can appreciate that the problems associated with cores described herein with respect to SMPS similarly exist for cores when applied to other systems and applications that do not utilize SMPS. In general, existing inductive cores are unable to meet the desired specification requirements, particularly at high frequencies.

SUMMARY OF THE INVENTION

There is a need in the art for a core material that is capable of better satisfying the requirements of high frequency operation. There is also a need in the art for core components, such as inductive cores and devices and systems thereof, that implement such a material. The present invention is directed toward solutions to address these needs, in addition to having other desirable characteristics that will be appreciated by one skilled in the art upon reading the present specification.

In accordance with embodiments of the present invention, a composite material can include a grain component having a magnetic ferrite phase. A nanostructured magnetic grain boundary component that is both magnetic and insulating can be included. The nanostructured magnetic grain boundary component can have a magnetic flux density of greater than about 250 mT.

In accordance with further embodiments of the present invention, the nanostructured magnetic grain boundary component can have an electrical resistivity of about $10^8$ to $10^{12}$ Ω-cm. The nanostructured magnetic grain boundary component can include NiZn ferrite nanoparticles having a magnetic ferrite phase consisting principally of the elements Ni, Zn, Fe, and O. The grain component can include a MnZn ferrite material.

In accordance with additional embodiments of the present invention, an apparatus can include a composite material, and the composite material can include a grain component having a magnetic ferrite phase. A nanostructured magnetic grain boundary component that is both magnetic and insulating can be included. The nanostructured magnetic grain boundary component can have a magnetic flux density of about 250 mT or greater.

In accordance with further embodiments of the present invention, the apparatus can be a core component. The apparatus can be a core component selected from the group consisting of a ferrite toroid, a ferrite plate, a ferrite disk, a ferrite C core, a ferrite CI core, a planar E core, an EC core, a EFD core, a EP core, a ETD core, an ER core, a planar ER core, a U core, a RM/I core, a RM/LP core, a P/I core, a PT core, a PTS core, a PM core, a PQ core, a gaped toroid, a bobbin core, a ferrite E-core, and a ferrite EI-core. The apparatus can be a device including a core component, and the core component can include the composite material. The apparatus can be a device including a core component, and the core component can include the composite material, and the device can be selected from the group consisting of a transformer, an electronic device, an inductor, a power electronic device, a power converter, an inductor device, a transmit and receive module (TRM), an Electronically Scanned Phased Arrays (ESPA) system, an Electronic Warfare (EW) system, and a communication device having a SMPS conditioning component.

In accordance with additional embodiments of the present invention, a method for manufacturing a composite material can include providing a first component having a magnetic ferrite phase. A second component can be provided that is both magnetic and insulating. A mixture of the first component and the second component can be produced. In the mixture, the second component can be disposed at the grain boundaries of the grains of the first component, thereby forming a nanostructured magnetic grain boundary component. The nanostructured magnetic grain boundary component can have a magnetic flux density of about 250 mT or greater.

In accordance with yet further embodiments of the present invention, the nanostructured magnetic grain boundary component can include NiZn ferrite nanoparticles. The first component can include MnZn ferrite particles. Producing the mixture can include combining the first component with the second component; forming the mixture of the first component and the second component; drying the mixture; and separating the mixture according to particle size. The mixture can be formed into a green body. The green body can be sintered. The green body can be heated prior to sintering the green body. The green body can be shaped as a core component selected from the group consisting of a ferrite toroid, a ferrite plate, a ferrite disk, a ferrite E-core, and a ferrite EI-core. An apparatus can be provided and the green body can be disposed in the apparatus, and the apparatus can be selected from the group consisting of a transformer, an electronic device, an inductor, a power electronic device, a power converter, an inductor device, a transmit and receive module (TRM), an Electronically Scanned Phased Arrays (ESPA) system, an Electronic Warfare (EW) system, and a communication device having a SMPS conditioning component.

BRIEF DESCRIPTION OF THE DRAWINGS

These and other characteristics of the present invention will be more fully understood by reference to the following detailed description in conjunction with the attached drawings, in which.

DETAILED DESCRIPTION OF THE INVENTION

Figure 1:
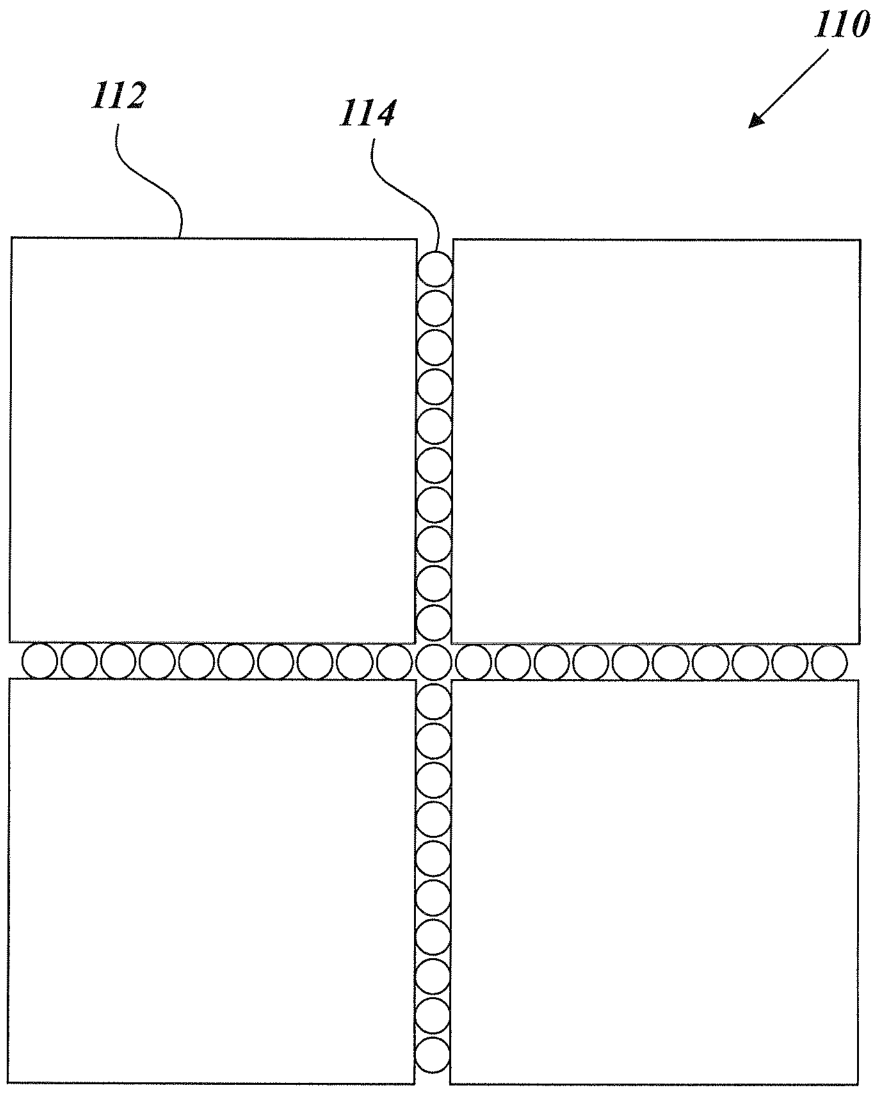
FIG. 1 is an illustrative diagram of MnZn ferrite powder having NiFz ferrite nanoparticles disposed at the grain boundary, according to one embodiment of the present invention.

An illustrative embodiment of the present invention is grounded in the scientific discovery that implementing a grain boundary material that is not only insulating but also magnetic can be extremely beneficial in ferrite cores operating at high frequencies (e.g., about 0.1-10 MHz). In particular, it has been found that utilizing grain boundary materials that are magnetic can greatly improve performance by providing magnetic continuity between the grains of the resultant core material. This can significantly improve the net magnetic flux density of the composite material possessing such grain boundary material, thus improving performance of core components implementing such composite materials. Test results provided herein demonstrate the effectiveness of providing insulating, magnetic materials at the grain boundaries to produce cores that are highly efficient at high frequencies. Embodiments according to the present invention utilize a design for an artificial composite material that includes an insulating, magnetic component at the grain boundary, which counters an extremely vast body of existing teachings and conventional thought in the art. In further embodiments according to the present invention, the insulating, magnetic component has a magnetic flux density of at least about 250 mT.

The performance of the cores can be improved further by selecting magnetic grain boundary materials that are highly resistive and by utilizing particular desirable core material (e.g. grain) particle sizes and grain boundary material particle sizes. However, such features as particle size, particular values of magnetization, and particular values of electrical resistivity, do not limit embodiments of the present invention. Rather, the present invention contemplates any core material, resultant core component, or resultant device/system application, which is made from a material having a grain boundary material that is magnetic and insulating.

Conventional teachings in the art suggest that increasing the permeability of a core material operating at high frequencies results in greater Eddy current losses. This is because mathematically, the skin depth produced by Eddy currents is inversely proportional to the square root of permeability. Smaller skin depths are associated with higher current density, which tends to magnify the effects of resistive losses and causes overheating. Given that skin depth is also inversely proportional to current frequency, the teaching in the art heretofore has been that high frequency operation requires insulating core materials having relatively low permeability. For example, this teaching explains why iron wire is not used in electrical lines.

Accordingly, insulating oxides such as CaO, $SiO_2$, $Ta_2O_5$, $Nb_2O_5$ are typically utilized as grain boundary materials in cores operating at high frequencies because they have high resistivity. While such insulators are effective at increasing resistance for purposes of frustrating Eddy currents, the present inventors have recognized that such insulating oxides are associated with certain side effects that are undesirable. One such side effect is the reduction of the net magnetic flux density of the composite material. Magnetic flux density is decreased by such insulators since they possess no magnetization, which creates magnetic discontinuity within the composite material. Continuity of magnetization, on the other hand, has been found to increase magnetic effects of the composite material, and increases the composite material's overall values of $B_S$ and $\mu_r$. This is because a magnetic grain boundary material contributes more magnetic spins to the total magnetization, and also enables an enhancement of inter-grain magnetic coupling of spins due to interaction of magnetic spins between grains. Higher magnetic flux density results in greater induction of a magnetic field, which has been proven directly by test data provided herein.

Another undesirable side effect of utilizing insulating oxides as grain boundary materials is the increased possibility for tunneling effects of electrons, due to the sizes of grain boundaries that are required for such implementation. Since the nonmagnetic oxide barriers result in a reduction of magnetization, a thin thickness of the barrier is usually expected in order to retain high magnetization. But employing thin barriers yields the side effect of increased probability of electron tunneling, since smaller distances are associated with higher tunneling probabilities. Higher levels of electron tunneling result in lower effective resistance, since tunneling can enable electrons to flow even in the presence of such insulating materials and oxides. Flow of electrons, even in the case of tunneling, results in higher losses from resistive heating and Eddy currents.

Therefore, based on these discoveries and recognitions, embodiments of the present invention implement artificial composite materials including a grain boundary material that is both insulating and magnetic. In further embodiments of the present invention, the grain boundary material has a relatively high value of electrical resistance and a relatively high value of magnetization, in order to further improve the characteristics for particular applications. Utilizing such a grain boundary material that is insulating and also magnetic enables efficient operation in the high frequency range. In some embodiments of the present invention, the operating frequencies of the resultant composite material are about 0.1 MHz to about 10 MHz. In yet further embodiments of the present invention, the operating frequencies of the resultant composite material are about 1 to 7 MHz.

FIGS. 1 through 16, wherein like parts are designated by like reference numerals throughout, illustrate example embodiments of ferrite cores made from artificial composite materials including grain boundary material that is magnetic and insulating, according to the present invention. Although the present invention will be described with reference to the example embodiments illustrated in the figures and implemented for particle sizes and particular materials (e.g., NiZn and MnZn materials), it should be understood that many alternative forms can embody the present invention. Specifically, many other types of suitable materials and corresponding sizes are possible and will be appreciated by one skilled in the art, upon reading the present specification. Furthermore, one skilled in the art will additionally appreciate different ways to alter parameters of the embodiments disclosed, such as the size, shape, type of elements or materials, composition of grain material, composition of grain boundary material, frequency range of operation, magnetic properties of the materials, optimization factors, and the like, in a manner still in keeping with the spirit and scope of the present invention. The illustrative use of MnZn and/or NiZn materials, and their corresponding particle sizes, in no way limit embodiments of the present invention.

FIG. 1 depicts an artificial composite material 110 having a plurality of geometryin polycrystalline MnZn ferrite grains 112, which serve as a grain component of the material composite 110. The plurality of ferrite grains 112 collectively forms a MnZn ferrite powder. The artificial composite material 110 also includes a grain boundary component. As depicted in FIG. 1, located at the grain boundary of the grains 112 are NiZn ferrite nanoparticles 114 that have a nonzero magnetization and are electrically insulating. In example embodiments, the MnZn ferrite grains 112 can have an average particle size of about 0.5-50 microns. In further example embodiments, the average particle size of the ferrite grain component is about 1-10 microns, and further can be about 3-4 microns. In example embodiments, the NiZn ferrite nanoparticles 114 can have an average particle size of about 1-100 nanometers. In further example embodiments, the average particle size of the grain boundary component can be about 1-50 nanometers, and more specifically can be about 1-20 nanometers. In yet further example embodiments, the average particle size of the grain boundary component is about 10-20 nanometers. The ratio of NiZn ferrite to MnZn ferrite can be controlled within about 1-20 wt-%, in order to enhance the high frequency magnetic properties and other performance characteristics of the composite material 110. In further embodiments, this ratio can be controlled to about 1-15 wt-%, and in yet further embodiments can controlled to be about 1-10 wt-%. The specific ratio of grain material to grain boundary material can be selected based on the desired performance characteristics and the intended applications (e.g. type of device, type of circuit, intended system application, etc.).

In example embodiments, the MnZn ferrite powder can be made from Fe-rich non-stoichiometric $(Mn_{0.62}Zn_{0.38})Fe_{2.25}O_{4\pm\Delta}$ with an additive of $TiO_2$ (about 0.1-1 wt-%). The MnZn ferrite powder can have an initial permeability $\mu_i$ of about 300-1000, a magnetic flux density $B_S$ of about 400-500 mT, a Curie temperature $T_C$ of greater than about 200° C., and a resistivity of about 500-5000 Ω-cm. One skilled in the art will appreciate that these values are illustrative and in no way limit composite materials according to embodiments of the present invention.

In example embodiments, the NiZn ferrite nanoparticles 114 can be made from Fe-deficient, non-stoichiometric $Ni_{(1-x)}Zn_xFe_yO_4$, (where x equals about 0.3-0.7 and y equals about 1.70-1.95). The NiZn ferrite nanoparticles 114 can possess an initial permeability $\mu_i$ of about 5-100, a magnetic flux density $B_S$ of about 250-500 mT, and a resistivity of about $10^8$-$10^{12}$ Ω-cm. In further example embodiments, the magnetic flux density is about 340 mT and the resistivity is about $10^8$-$10^9$ Ω-cm. One skilled in the art will appreciate that these values are illustrative and in no way limit the composite materials according to embodiments of the present invention.

The initial permeability $\mu_i$ of the composite material 110 can be about 300-1000, the magnetic flux density $B_S$ of the composite material 110 can be greater than about 450 mT, the Curie temperature $T_C$ of the composite material 110 can be about 220-300° C., and the resistivity of the composite material 110 can be about $10^3$-$10^5$ Ω-cm and in yet further embodiments can be about $10^4$ Ω-cm.

Figure 2:
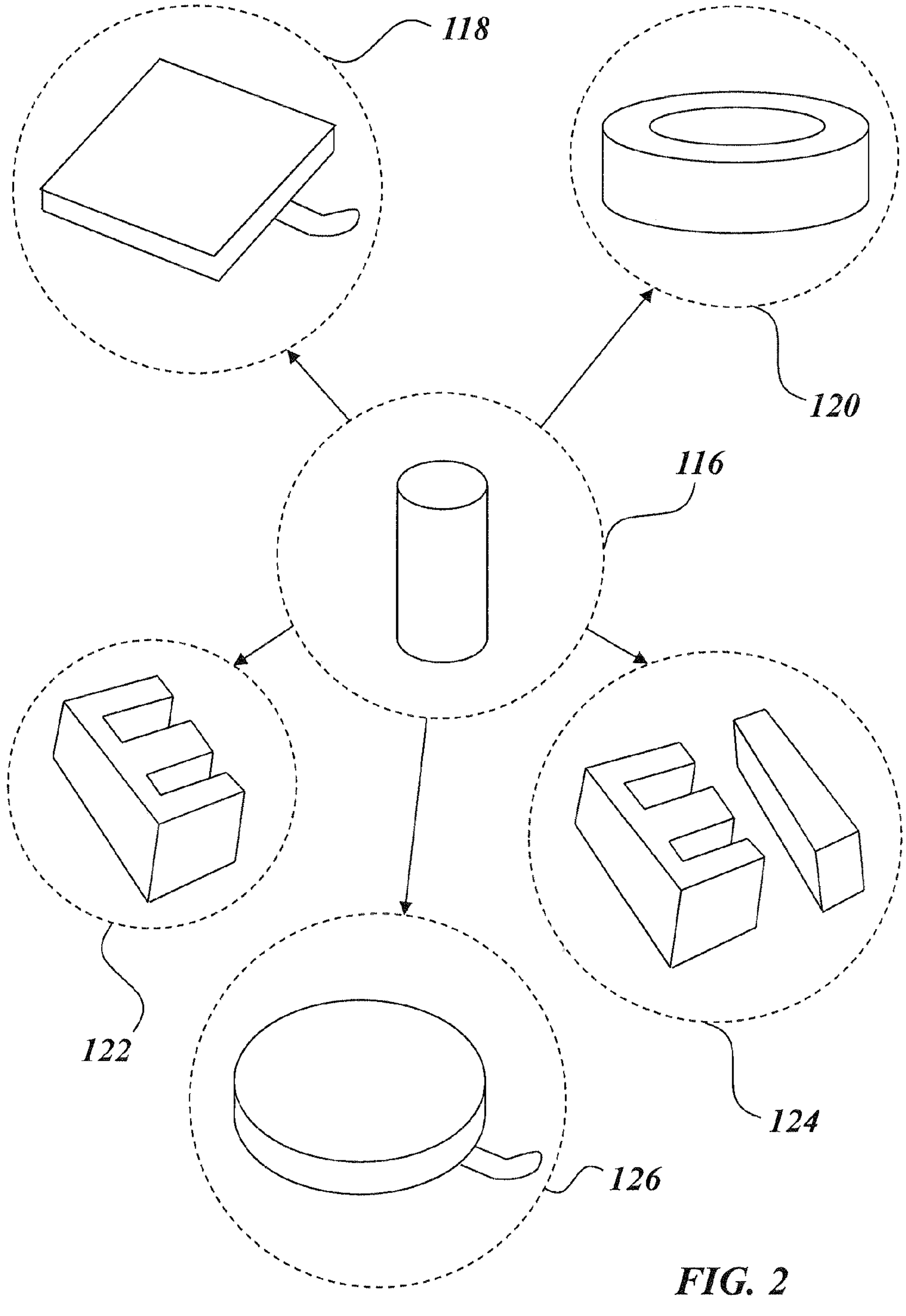
FIG. 2 is an illustrative diagram of several core components, according to embodiments of the present invention.

FIG. 2 depicts a core component 116 comprising and constructed from the composite material 110. The core component 116 can be any known core component or ferrite part, including ferrite plates 118, ferrite toroids 120, ferrite E-cores 122, ferrite EI-cores 124, ferrite disk 126, and other core components and ferrite parts. For example, other core components and ferrite parts include ferrite C cores, ferrite CI cores, planar E cores, EC cores, EFD cores, EP cores, ETD cores, ER cores, planar ER cores, U cores, RM/I cores, RM/LP cores, P/I cores, PT cores, PTS cores, PM cores, PQ cores, gaped toroids, bobbin cores, and any other core components or ferrite parts. The particular shape and size of the core component 116 are determined by factors such as intended device applications, frequency range of operation, type of input signal (AC, DC, amplitude, phase, etc.), type of output signal (AC, DC, amplitude, phase, etc.), and other adjustable factors. These factors and how they affect the particular core component 116 are well known in the art.

Figure 3:
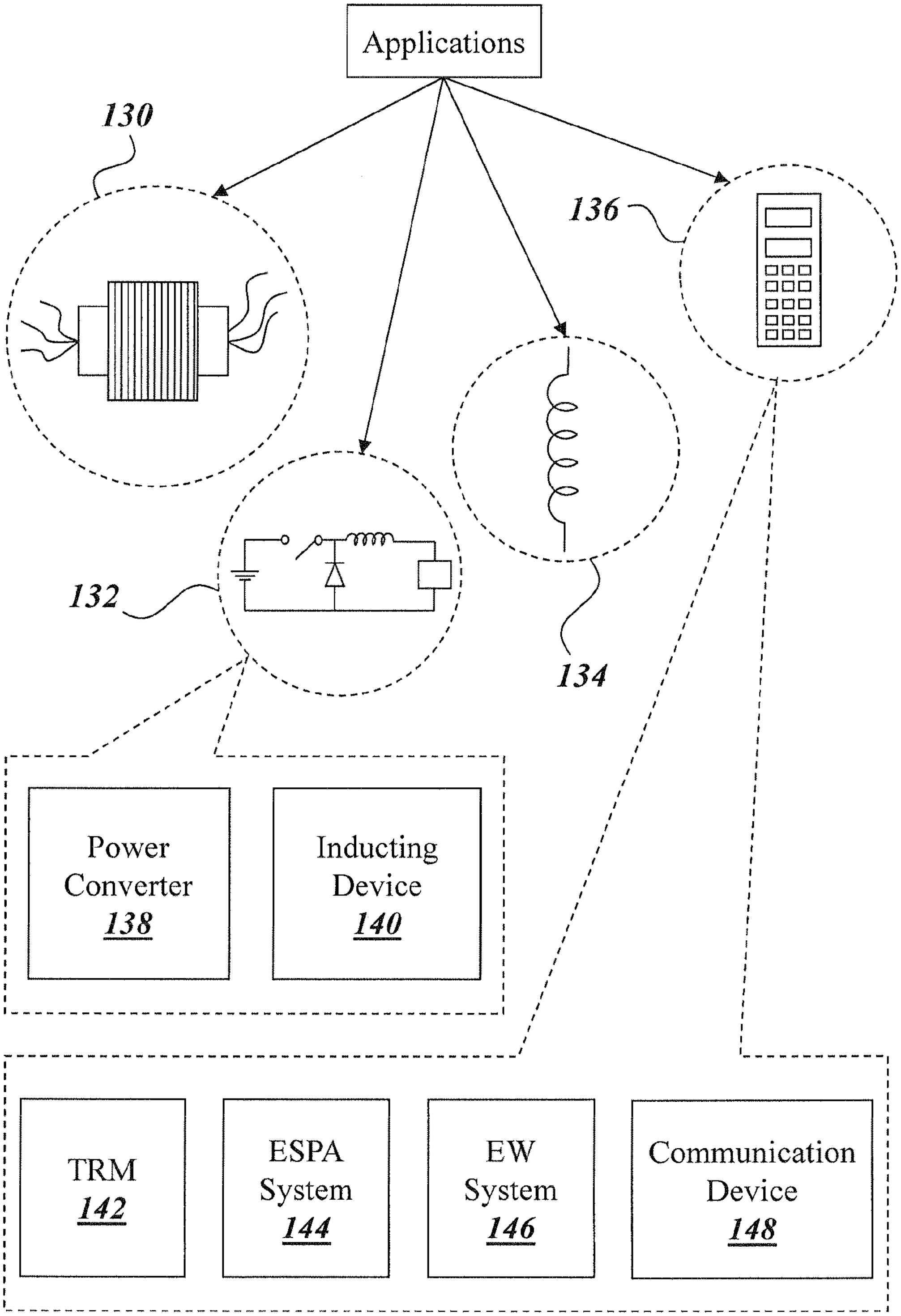
FIG. 3 is an illustrative diagram of electronic applications, device applications, and system applications, according to embodiments of the present invention.

Generally, one skilled in the art can appreciate that core components according to embodiments of the present invention (e.g., inductive cores), can be used for many applications, including in SMPS systems, power conditioners, power generators, power converters, and many other applications. FIG. 3 depicts several example applications, including electronic components, electronic devices, and systems utilizing the composite material 110 and/or utilizing the core components 116 according to embodiments of the present invention. Specifically, FIG. 3 depicts a transformer 130, an electronic component 132, an inductor/reactor 134, and a power electronic device 136, for example a power electronic device utilizing SMPS. As further non-limiting examples, the electronic component 132 can be a power converter 138 (e.g., an AC-to-AC converter, AC-to-DC converter, DC-to-AC converter, and DC-to-DC converter), an inducting device 140 (e.g., a high frequency inductive heater, an uninterruptible power supply system, a current sensor, a filter inductor, and other inducting devices), a conditioning component, and other electronic components/devices. As additional examples, the power electronic device 136 can be a transmit and receive module (TRM) 142, an Electronically Scanned Phased Array (ESPA) system 144, an Electronic Warfare (EW) system 146, a communication device 148 having a SMPS conditioning component (e.g., a satellite communication device, a wireless communication device, a radar device, and other communications devices) and other power electronic devices. These examples demonstrate that the electronic component 132 and the electronic device 136 can be any known electronic component/device that utilizes, is suitable for utilizing, or is involved in SMPS. Accordingly, the particular illustrative examples of FIG. 3 do not limit embodiments of the present invention to such applications.

All of the devices, electronic components, and systems of FIG. 3 can be built and used according to methods that are well known to those skilled in the art. Given that these methods are well known and widespread in the art, further detail and description regarding the manufacture and use of such devices is redundant and unnecessary.

Nonetheless, for purposes of clarity, one example method for manufacturing core components 116 according to illustrative embodiments of the present invention is described herein, with reference to FIGS. 4 through 7. Regarding the MnZn ferrite powder, production can involve conventional techniques known to those skilled in the art. For example, a ceramic processing technique can be used. In one example embodiment, the MnZn ferrite powder is manufactured to have a chemical composition of: $Mn_{0.62}Zn_{0.38}Fe_{2.25}O_{4\pm\delta}$. To achieve this composition, about 53 mol % $Fe_2O_3$, about 29 mol % MnO, and about 18 mol % ZnO can be weighed and mixed in a planetary mill with an additive of about 0.1-1.0 wt % $TiO_2$. The mixed oxides are then calcined at about 900° C. for about 5 hours. The calcined powders next are ground and sieved in order to achieve the particular desired particle size of the calcined MnZn ferrite particles. For example, the particle size range can be about 0.5-50 μm, or in further example embodiments can be about 1-10 μm, or in yet further example embodiments, can be about 3-4 μm. These sizes, materials, and other related preferences can change as appreciated by one skilled in the art, depending on the particular concentrations being utilized, as well as the intended applications and desired performance characteristics.

Figure 4:
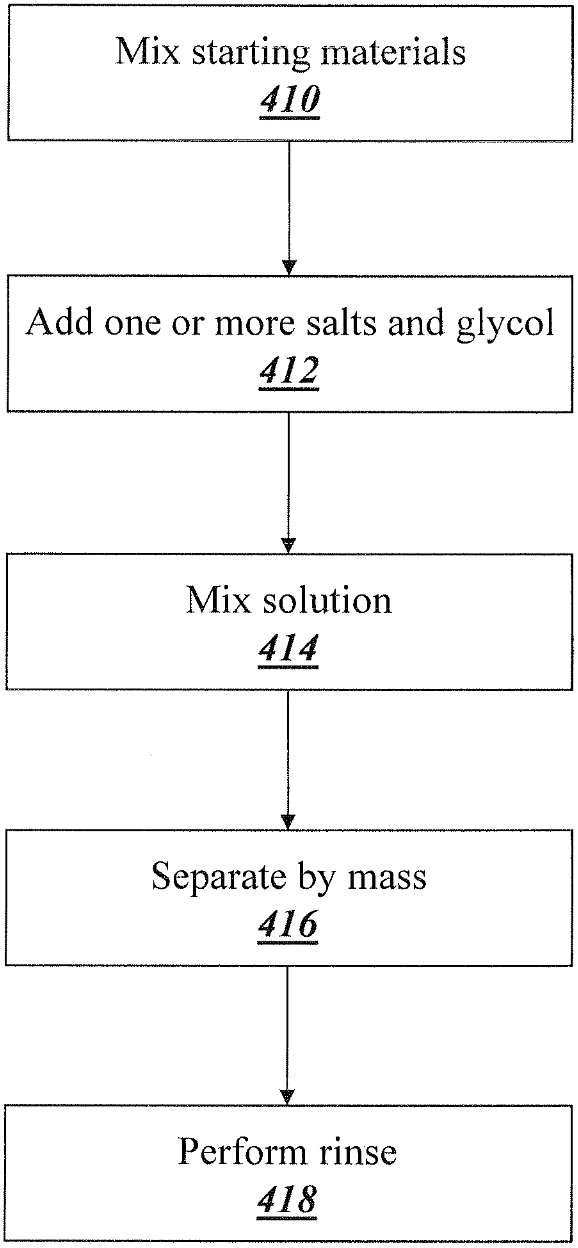
FIG. 4 is a flow chart of a process for producing MnZn ferrite powder, according to aspects of the present invention.

FIG. 4 depicts one example method for manufacturing the NiZn ferrite nanoparticles 114. In example embodiments, the NiZn ferrite nanoparticles 114 can be manufactured to have a chemical composition of: $Ni_{0.6}Zn_{0.4}Fe_{1.9}O_4$. First, starting materials are mixed to form a mixture (step 410). The starting materials can be mixed in the appropriate stoichiometric ratios in the following amounts: about 8.90 wt-% of Ferrous Chloride ($FeCl_2.4H_2O$), about 1.7-4.0 wt-% of Zinc Acetate Dihydrate ($C_4H_6O_4Zn.2H_2O$), about 1.7-4.0 wt-% of Nickel Acetate Tetrahydrate ($(C_2H_3O_2)2Ni.4H_2O$), and about 85.32 wt-% of Sodium Hydroxide (NaOH). These materials can be in the form of powders prior to being mixed or during the step of mixing. Next, the mixture, along with one or more salts and one or more chlorides, can be added to a larger vessel containing a glycol to create a solution (step 412). The glycol can be preheated to a temperature of about 100-200° C., and in further example embodiments can be heated to a temperature of about 160° C. Heating can occur utilizing any suitable heating mechanism, such as a hot plate. The large vessel can be, for example, a flat bottom beaker. The glycol can be any suitable form of glycol known in the art; for example, tetraethylene glycol can be used.

Subsequently, the solution can be mixed using a motorized stirrer (step 414). Mixing can occur at 300 rpm for 1 hour, or at any other combinations of stirring rates and times that are appropriate for achieving the same effect, as appreciated by one skilled in the art. The stirred solution can be separated into discrete groups of particles according to their mass (step 416). This can be performed using standard centrifuge techniques. Next, a rinse can be performed to remove excess glycol (step 418). For example, the rinse can be a methanol rise, or can involve any other known rinsing agents. The result from such a rinse is a collection of the NiZn ferrite nanoparticles 114. The particular size of the NiZn ferrite nanoparticles 114 can vary depending on intended applications of the resultant core component. The NiZn ferrite nanoparticles 114 can have a size of about 1-100 nm. In further example embodiments, the size of the NiZn ferrite nanoparticles 114 is about 1-50 nm and more specifically about 1-20 nm, and in yet further example embodiments, the size of the NiZn ferrite nanoparticles 114 is about 10-20 nm. These sizes can change depending on the particular concentrations being utilized, as well as the intended applications and desired performance characteristics.

Phase purity of the manufactured materials can be confirmed using techniques such as X-ray diffraction (XRD). Furthermore, particle size can be confirmed using scanning electron microscopy (SEM) and transmission electron microscopy (TEM).

Figure 5:
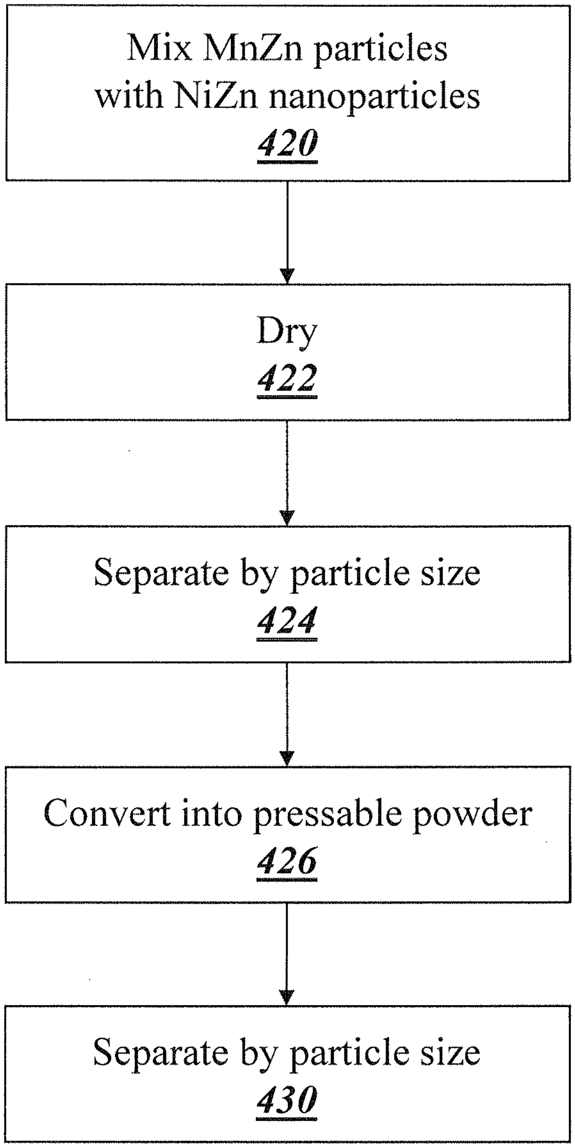
FIG. 5 is a flow chart of a process for producing NiFz ferrite nanoparticles, according to aspects of the present invention.

FIG. 5 depicts one example method of manufacturing a pressable powder according to the composite material 110 made from the MnZn ferrite particles 112 and the NiZn ferrite nanoparticles 114. The pressable powder can be used to form the core components 116. First, the MnZn ferrite particles 112 are mixed with the NiZn ferrite nanoparticles 114 in alcohol by plenary ball miller for 4-10 hours (step 420). The ratio of NiZn to MnZn ferrite particles can be controlled to between about 1-20 wt-%. In several example embodiments, the ratio was maintained at about 2 wt-%, about 5 wt-%, and about 7 wt-%. Once mixed, the mixture is dried to form a powder (step 422). For example, drying can occur at 100° C. Next, the powder is separated according to particle size (step 424). This can entail sieving the powder with a #200 sieve. Once the desired particle sizes are obtained, the powder is converted into a pressable powder (step 426). This can be performed by adding about 5-10 wt-% of binder. In such embodiments, about 10 wt-% polyvinyl alcohol-PVA solution can be mixed in with the powder. This can provide the benefit of giving additional strength to the powder once it has been pressed.

The pressable powder is subsequently separated by particle size (step 430), for example via screening through a #40 sieve. This granulation can enhance the flow characteristic of the resulting ferrite powders during a later step of die-pressing. Specifically, the binder can facilitate particle flow during compacting and increases the bonding between particles, presumably by forming bonds of the type particle-binder-particle.

Figure 6:
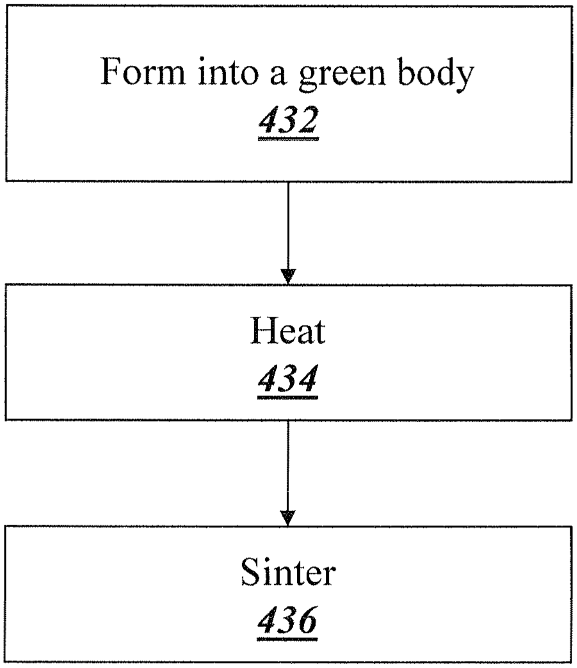
FIG. 6 is a flow chart of a process for forming a core made up of MnZn ferrite powder and NiFz ferrite nanoparticles, according to aspects of the present invention.

As depicted in FIG. 6, the pressable powder can be formed into a green body (step 432). For example, this can involve forming a green body having a shape of a toroid and subjecting the formed green body to a uniaxial pressure of 1-2 tons/$cm^2$. Typical pressing mechanisms can be used. One skilled in the art can appreciate that the exact quantities, pressure distributions, and other forming characteristics can depend heavily on the type of green body being formed and the resulting device or intended application of the core component 116 being formed. All such conditions are contemplated within the scope of the present invention. In the example green body described herein having the shape of a toroid, the green body further can have an outer diameter of about 13-18 mm, an inner diameter of about 5-8 mm, and a thickness of about 1.5-3 mm.

Next, the binder component of the pressable powder can be burned off of via heating (step 434), for example while exposed to air or another suitable oxidizing environment. In the illustrative operation of FIG. 6, heating rates of up to about 600° C. are used. Then, the core component 116 can be sintered (step 436), for example at about 1150-1250° C. for about 2 to 10 hours in a nitrogen gas atmosphere condition. Low oxygen partial pressure in the desired atmosphere condition can be controlled by increasing the flow rate of the nitrogen gas, e.g. 1-5 ml/minute. One illustrative sintering scheme is detailed in Table I, below.

TABLE I

Illustrative Sintering Scheme

| Step | Temperature | Ramping/cooling rate or exposure duration | Atmosphere |
|---|---|---|---|
| 1 | About room temp-1000° C. | about 5° C./min | in air |
| 2 | About 1000° C. | about 3 hours | About 1-5 lit/min, $N_2$ gas |
| 3 | About 1000-1250° C. | about 6.6° C./min | About 1-5 lit/min, $N_2$ gas |
| 4 | About 1250° C.* | about 2-5 hours | About 1-5 lit/min, $N_2$ gas |
| 5 | About 1200-1100° C. | about −5° C./min | About 1-5 lit/min, $N_2$ gas |
| 6 | About 1100-900° C. | about −1° C./min | About 1-5 lit/min, $N_2$ gas |
| 7 | About 900-300° C. | about −5° C./min | About 1-5 lit/min, $N_2$ gas |
| 8 | <about 300° C. | Natural cooling until room temperature is reached | Turn off $N_2$ gas |

*sintering temperature range: about 1200-1250° C.

Figure 7:
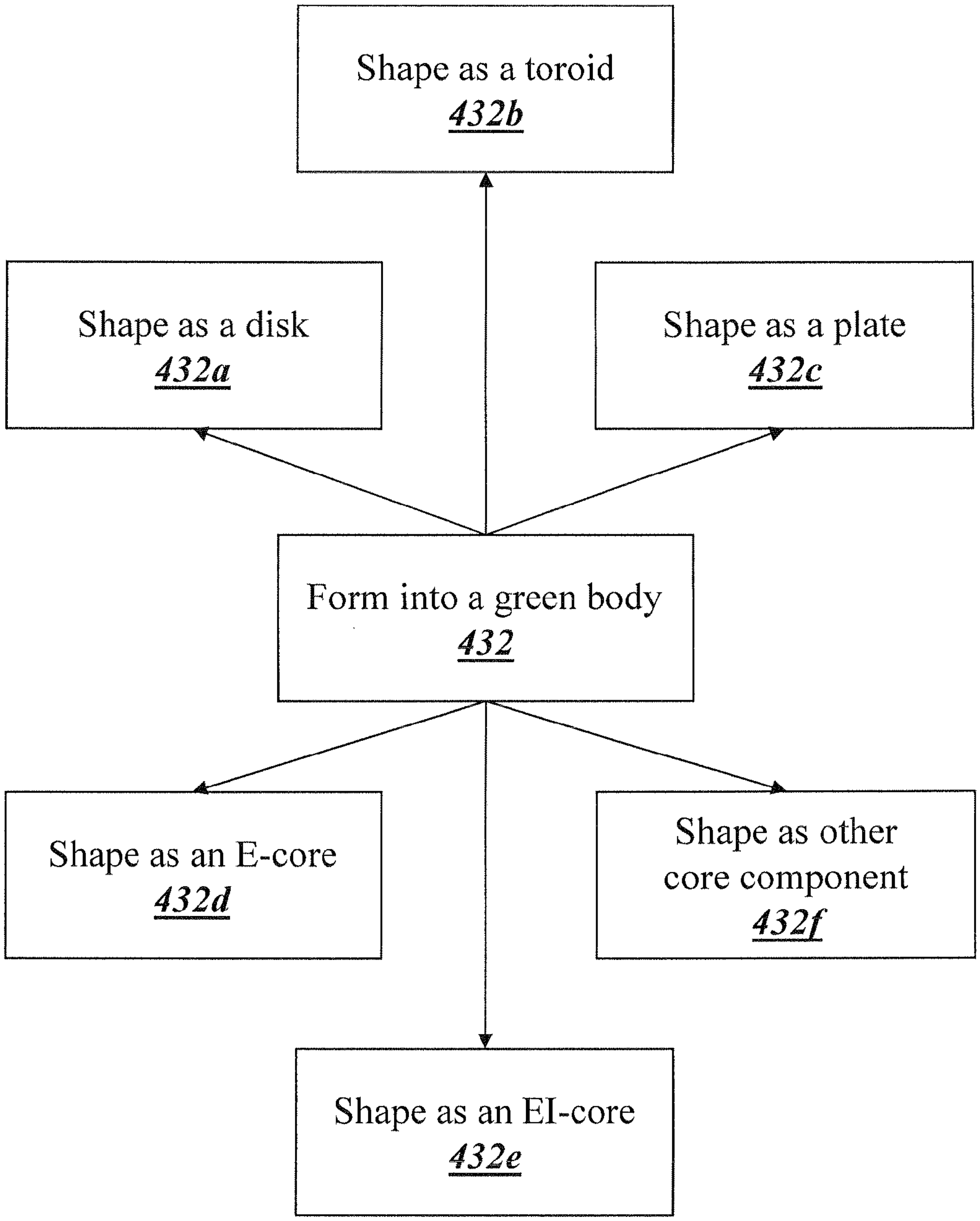
FIG. 7 is a flow chart depicting examples of ways to perform step 432 of FIG. 6, according to aspects of the present invention.
Figure 8:
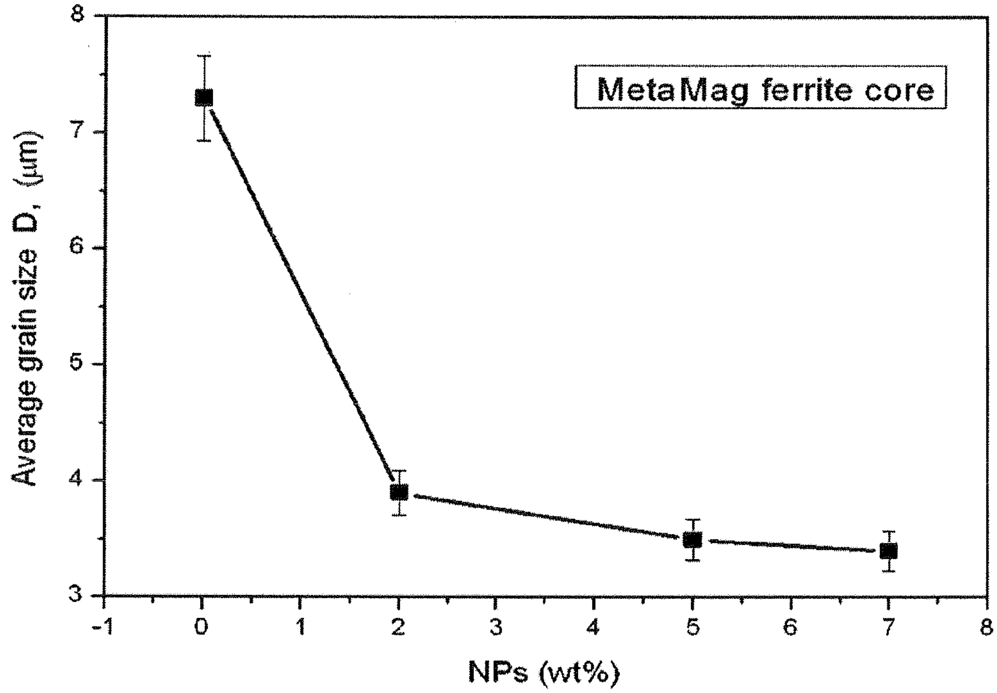
FIG. 8 is a graph depicting test results of average grain size as a function of NiZn ferrite nanoparticle concentration, according to aspects of the present invention.

As depicted by FIG. 7, step 432 of ng the pressable powder into green body specifically can include forming the pressable powder into a number of shapes or core components such as the core components 116. For example, step 432 can include shaping as a disk 432*a*, shaping as a toroid 432*b*, shaping as a plate 432*c*, shaping as an E-core 432*d*, shaping as an EI-core 432*e*, shaping as another core component 432*f*, or shaping according to other desired geometries as would be understood by one skilled in the art.

The method described herein is illustrative and is not intended to limit the scope of the present invention. Upon reading the present specification, one skilled in the art will appreciate a variety of alternative methods for manufacturing the composite material 110. All such methods are contemplated within the scope of the present invention. One skilled in the art additionally will appreciate that embodiments of the present invention can be manufactured using any suitable conventional ceramic methods. As yet other examples, known chemical processes can be suitable for manufacturing embodiments of the present invention, with the exception of direct chemical synthesis techniques. Embodiments of the present invention also cab be manufactured according to microwave sintering, which uses microwave energy to sinter the compact without the use of pressure. In manufacturing techniques involving the application of a pressure, this can be achieved using uniaxial pressure, cold isostatic pressure (CIP), hot isostatic pressure (HIP), any other pressure application, or any combination thereof.

Core components (including the core components 116) that implement the composite material 110 can function according to any known operational techniques. However, for the sake of illustration, operation of one example method pertaining to SMPS will be described herein. The following operational features are well known to those skilled in the art and can be varied in a wide number of ways depending on the particular details of operation, such as the type of circuit, the input supply characteristics, the output supply characteristics, and other adjustable factors. One skilled in the art can appreciate that basic operation of an SMPS system occurs as follows. Initially, there is some input power supply entering into the converter, rectifier, etc. circuit. Flipping the switch to the "off" position (e.g. opening the switch) shuts off the input power supply, causing the input power to rapidly decrease. The decrease in input power induces an opposing EMF that acts to counter the decreasing input power supply. The energy associated with the induced EMF is stored in the ferrite core in the form of an induced magnetic field. Given the induced EMF possesses a positive magnitude in the initial direction of the input power signal, positive energy is stored in the core. Next, the induced magnetic field induces a current in one or more coils and/or windings that wind around the core. The induced current supplies additional input power to the circuit, which is used to drive an output signal during the portion of the switching phase when the switch is in the "off" position.

Since the induced EMF opposes the decrease in the input signal, SMPS systems can store and use positive energy in a core to generate output power during all times of the switching cycle. Said differently, for highly efficient SMPS systems, turning off the input signal does not result in turning off the output power. The input power supply is interrupted, while the output power supply is continuous. This is a highly efficient manner of regulating and supplying power.

During such SMPS operation, utilizing a core that comprises the example composite material 110 greatly improves performance and efficiency. The NiZn particles located at the grain boundaries separating MnZn grains serve to impede electronic penetration through the grain boundary while enhancing magnetic penetration and magnetic continuity between grains. This promotes greater efficiency by reducing both Eddy current losses and magnetic leakage of the core. High frequency power loss thus is reduced without sacrificing high magnetic flux.

Many alternative embodiments are possible. While it has been described that the composite materials 110, core components 116, and power electronic devices 136 and electronic systems implemented according the illustrative embodiment are made from MnZn ferrite powder and NiZn ferrite nanoparticles 114, these choices of materials are merely illustrative. The invention is not limited to such choices. Upon reading the present specification, one skilled in the art will appreciate that many other materials can be used. For example, any insulator having a suitable magnetic flux density can serve as a magnetic grain boundary. Some alternative embodiments utilize other suitable magnetic, insulating nanoparticles, such as LiZn ferrite, or ferrites composed of Mn, Zn, Ni, Li, or any combination thereof, with the dominant cation being Fe. One skilled in the art will appreciate many other compositions of ferrite powders and magnetic materials that can serve as the grain boundary material. All such alternatives are contemplated by the present invention.

In additional alternative embodiments, other materials are substituted for MnZn ferrite powder. One skilled in the art will appreciate a wide range of suitable grain materials that can be implemented based on the intended applications. For example, any conventional ferrite powder used in cores can be suitable. More specifically, this can include Li-ferrites, Ni-ferrites, Mn-ferrites, Mg-ferrites, and other suitable grain materials.

In additional alternative embodiments, the magnetic grain boundary material and the grain material can be adjusted in order to maximize performance at different frequencies. For example, low core loss can be achieved at relatively low frequency (less than about 2 MHz) by changing the composition of the grain material and the composition of the grain boundary material, and by refining the high temperature sintering processes in order to achieve the necessary microstructure. Such procedures and changes are well known in the art. As one example, utilizing a finer grain structure is better suited for higher operational frequencies, while performance at lower operational frequencies can be achieved using a grain material having a larger particle size.

In additional alternative embodiments, different ratios of grain boundary materials to grain materials can be implemented. Taking up the example materials used in the illustrative embodiment, providing a greater concentration of NiZn ferrite particles with respect to MnZn ferrite can result in reduced MnZn ferrite particle grain sizes. For example, FIG. 8 graphs average grain size (in micrometers) as a function of the NiZn ferrite particle concentration (in wt-% of the composite material). When NiZn ferrite particle sizes make up 2 wt-% of the composite material, the grain size of the MnZn ferrite particles can be reduced to 4 μM, and when the grain size of the NiZn ferrite particles is 7 wt-% of the composite material, the grain size of the MnZn ferrite particles can be reduced to 4 μm.

Figure 9:
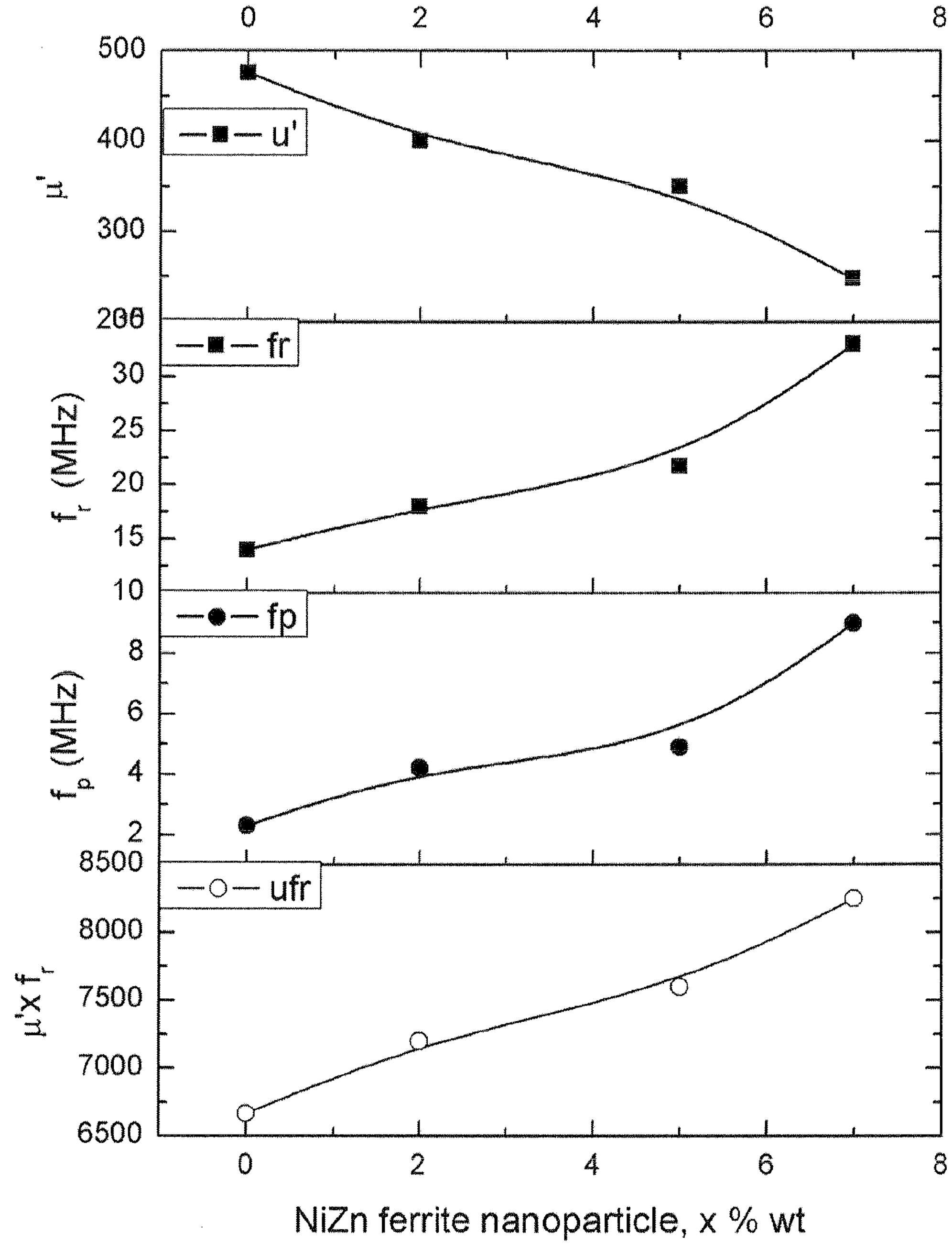
FIG. 9 illustrates four stacked graphs depicting test results of four performance characteristics as a function of NiZn ferrite nanoparticle concentration, according to aspects of the present invention.

Additionally, the respective proportions/concentrations of grain materials and grain boundary materials can vary. Changing these concentrations can be desirable depending on the intended device or applications of the core component 116. FIG. 9 depicts the dependence of various performance specifications on the relative proportion of NiZn ferrite particles in the composite material 110. The various y-axes depict the following performance properties: permeability, cutoff frequency, peak frequency, and the Snoek product, which one skilled in the art will appreciate is defined as $\mu_r \times f_r$. As shown in FIG. 9, permeability decreases with the concentration of NiZn ferrite particles. However, cutoff frequency f increases with NiZn ferrite particle concentration. Importantly, the Snoek product increases almost perfectly linearly from an initial value of 6,500 to a final value of 8,400 as the NiZn ferrite particle concentration increases from 0%-wt to 7%-wt. Peak frequency (represented by the variable $f_p$) is herein defined as the frequency at which permeability is maximized. This value determines the upper limit of the operating frequency. The bottom graph of FIG. 9 demonstrates that the peak frequency increases to 9 MHz as NiZn ferrite particles concentration increases. One skilled in the art will appreciate that this is a significant increase and can result in substantial performance improvements.

Three working examples of materials are provided herein for the sake of clarity and illustration. Furthermore, specific test results involving these materials are included to demonstrate the high performance, power efficiency, and other benefits that can be achieved by embodiments of the present invention. These examples are not intended to limit the present invention. It should be noted that the specific examples and test data provided below prove that the embodiments described herein result in significant benefits and improvements across the range of about 1 to 7 MHz. One skilled in the art can appreciate that these benefits and performance improvements will also extend to the broader frequency range of about 0.1 to 10 MHz.

EXAMPLES I-III

Figure 10:
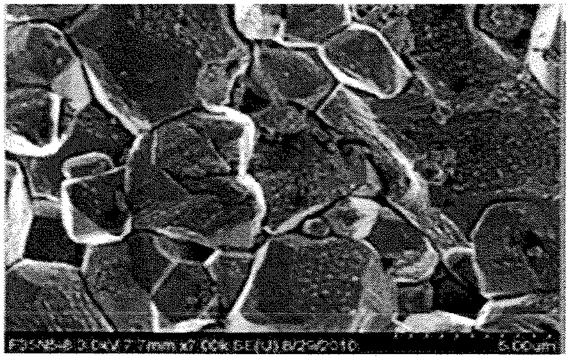
FIG. 10 illustrates three SEM images of example composite materials, according to embodiments of the present invention.
Figure 10:
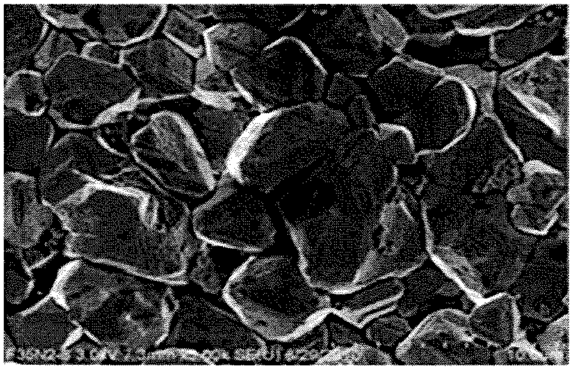
Figure 10:
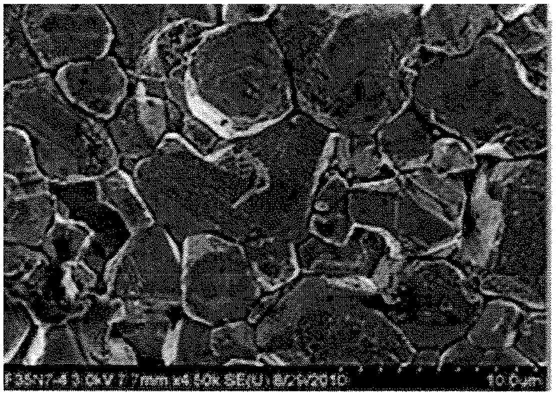

FIG. 10 depicts SEM images of the three example embodiments of sintered ferrite cores according to the present invention. As depicted by the visible boundary borders, the microstructures consist of MnZn ferrite grains surrounded by nanoscaled NiZn ferrite particles/clusters. The top image of FIG. 10 depicts Example I (herein referred to as B40N2), which possesses a distribution of 2 wt-% of NiZn particles. The middle image of FIG. 10 depicts Example II (herein referred to as B40N5), which possesses a distribution of 5 wt-% of NiZn particles. The bottom image of FIG. 10 depicts Example III (herein referred to as B40N7), which possesses a distribution of 7 wt-% of NiZn particles.

The composite materials of examples I-III were manufactured according to techniques described herein. Subsequent to manufacturing the materials, Energy Dispersive X-ray Spectroscopy (EDX) was also performed on Examples I-III. The fine particles on grains were found to be enriched in Ni, which confirmed the existence of NiZn ferrite nanoparticles and the results of the SEM images of FIG. 10.

Figure 11:
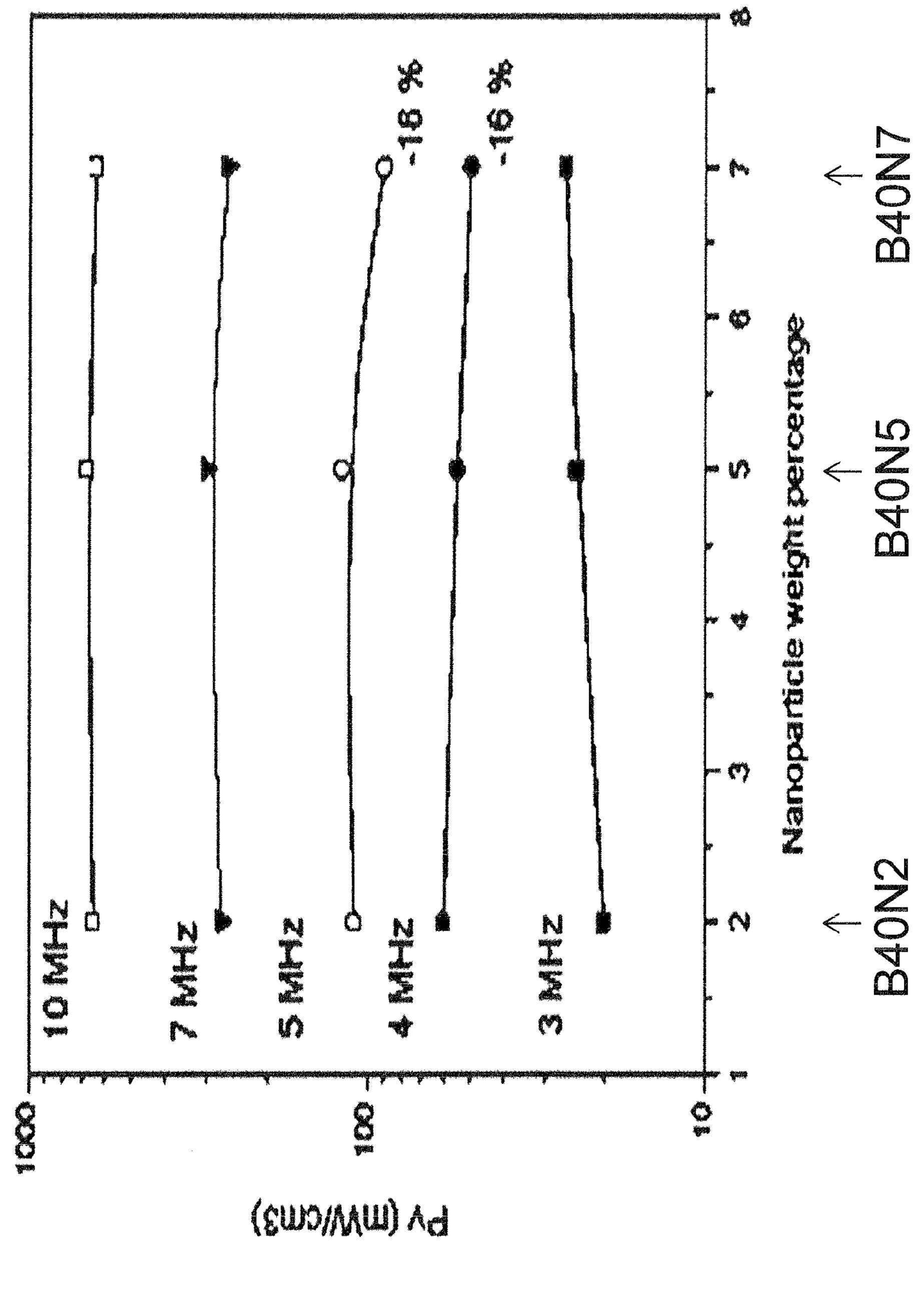
FIG. 11 is a graph depicting test results of power losses as a function of NiZn ferrite nanoparticle concentration for various operating frequencies, according to aspects of the present invention.

FIG. 11 depicts power losses that were measured for ferrite toroids formed from B40N2, B40N5, and B40N7. The measurements were taken over a frequency range of about 1-10 MHz. At 3 MHz, power loss ($P_v$) increased slightly from 20 mW/cm$^3$ to 25 mW/cm$^3$ as NiZn ferrite particle concentration increased 2 wt-% to 7 wt-%. At 4-5 MHz, P, decreases by 18% with increasing NiZn ferrite content. At 7-10 MHz, power loss was found to be almost independent of NiZn ferrite, as depicted by the top two curves in the graph of FIG. 11.

Figure 12:
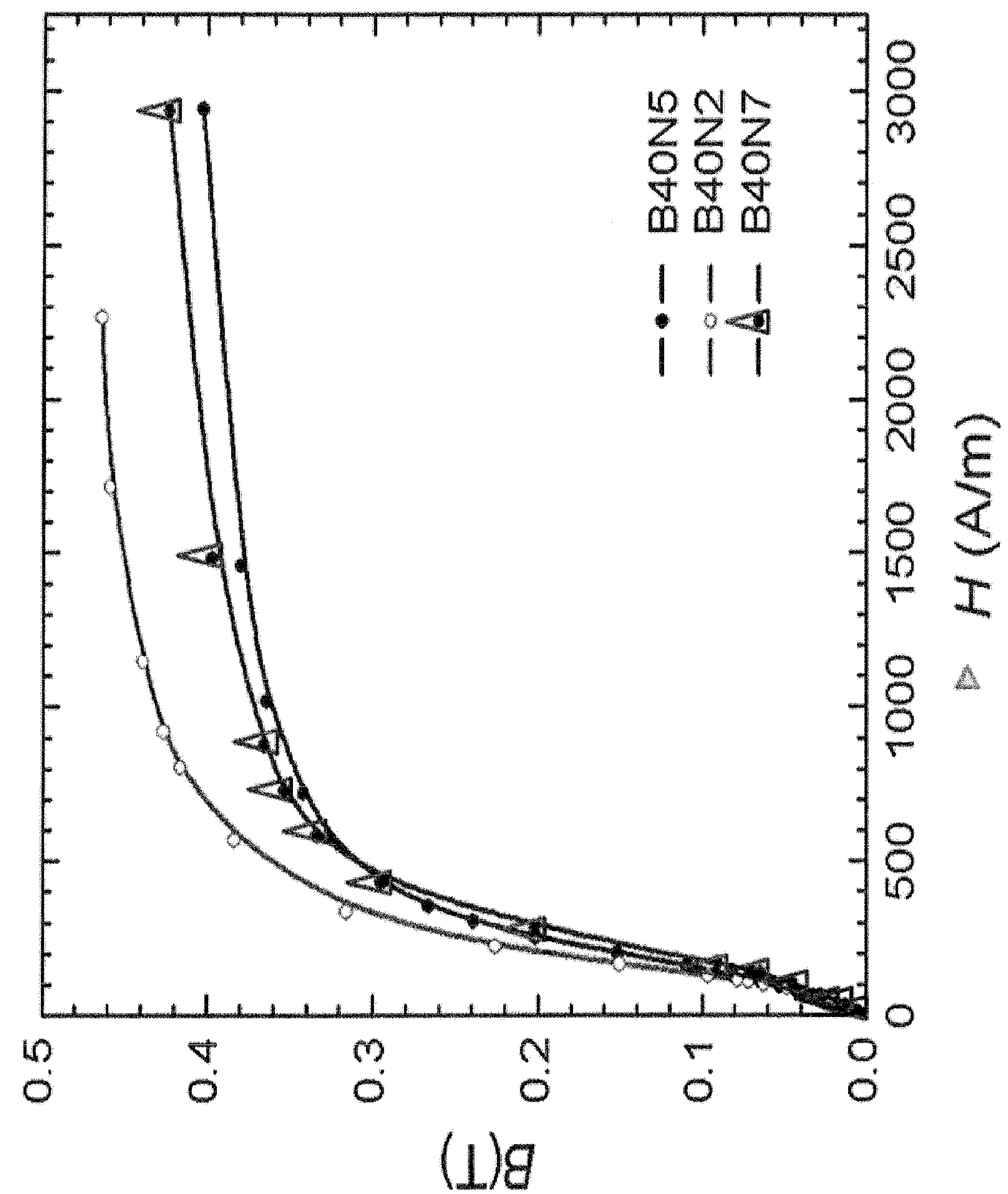
FIG. 12 is a graph depicting test results of saturation magnetic flux as a function of applied magnetic field for various samples having different NiZn ferrite nanoparticle concentrations, according to aspects of the present invention.

FIG. 12 depicts the saturation magnetic flux of ferrite cores made from B40N2, B40N5, and B40N7. As depicted by the graph, the example ferrite cores according to the present invention and represented in represented by FIG. 12 are characterized as having saturation magnetic flux $B_s$ of about 350-500 mT when the applied field is greater than 2 kA/m. One skilled in the art will appreciate that these values are notably higher than those of the commercial ferrite cores that operate at frequencies of 1-10 MHz. For example, comparisons with commercially available products are provided in Table II, below.

TABLE II

Comparison of Examples I-III with Commercial Products

| | $\mu_i$ | $f_p$ (MHz) | $f_r$ (MHz) | $B_s$ (mT) | $\mu_i \times f_r$ | $P_v$ (mW/cm$^3$) @ room temperature* B (mT) | 1 MHz | 2 MHz | 3 MHz | 4 MHz | 5 MHz | 7 MHz | 10 MHz |
|---|---|---|---|---|---|---|---|---|---|---|---|---|---|
| 4F1 | 80 | 50 | 85 | 320 | 6800 | 10 | | | 200 | | 550 | | |
| 3F5 | 650 | 2 | 10 | 380 | 6500 | 10 | 35 | | 400 | | | | |
| MN8CX | 3100 | 0.5 (est) | 2 (est) | 450 | 6200 | 10 | 80 | | 800 | | | | |
| B40N2 | 400 | 4.2 | 18 | 470 | 7200 | 10 | 15 | 50 | 120 | 270 | 500 | 1100 | |
| Ex. I | | | | | | 5 | 2.8 | 8.5 | 20 | 60 | 110 | 270 | 650 |
| B40N5 | 340 | 4.6 | 23 | 400 | 7580 | 10 | 25 | 70 | 150 | 330 | 630 | 1400 | |
| Ex. II | | | | | | 5 | 4 | 10 | 24 | 55 | 120 | 300 | 680 |
| B40N7 | 260 | 8.6 | 32.3 | 420 | 8400 | 10 | 35 | 90 | 160 | 310 | 560 | 1200 | |
| Ex. III | | | | | | 5 | 5 | 15 | 26 | 50 | 90 | 260 | 640 |
| B40 (I-III) vs. Commercial | 400 vs. 650 | 4.2 vs. 2 | 18 vs. 10 | 470 vs. 380 | 7200 vs. 6500 | | 15 vs. 35 | N/A | 120 vs. 400 | No commercial product | | | |

4F1 and 3F5 are commercially available products sold by the company operating under the name Ferroxcube International Holding B.V. MN8CX is a commercially available product sold by the company operating under the name Ceramic Magnetics, Inc. The above tests were performed in a controlled environment. In general, power loss was measured by a flux metric method. An LCR impedance analyzer was used to measure the frequency dependence of permeability.

Overall, B40N2, B40N5 and B40N7 show lower power losses than all of the available representative commercial products operating at frequencies ≥1 MHz. Additionally, B40N2, B40N5 and B40N7 have higher saturation magnetic flux densities $B_5$ (400-500 mT) and Snoek's product, ($\mu_i \times f_r$)=7,200-8,400. Furthermore, there is no commercial product that offers operational frequencies of higher than about 5 MHz. Examples I-III effectively expand the maximum operating frequency by 100%, from 5 MHz to 10 MHz, without resulting in the undesired side effect of high power losses. One skilled in the art will appreciate that this is a significant increase in bandwidth and performance.

Figure 13:
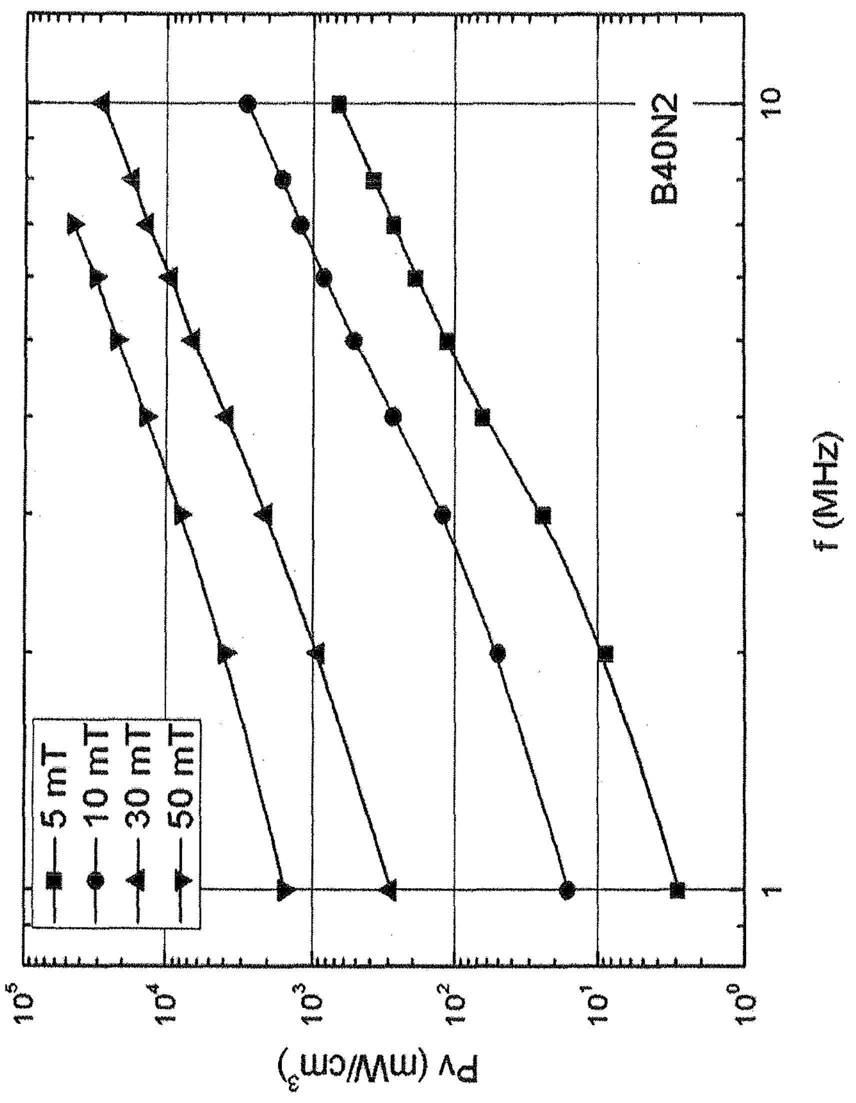
FIG. 13 is a graph depicting test results of power loss as a function of operating frequency for various applied magnetic fields for a sample having a NiZn ferrite nanoparticle concentration of 2 wt-%, according to aspects of the present invention.

FIG. 13 depicts the results of controlled tests on cores made from B40N2 to determine power losses at room temperature. Results are depicted using log scales. The frequency dependence of power loss changes according to magnetic flux, as depicted by the layered curves in FIG. 13. At B=5 mT, the power loss ranges from 3 to 200 mW/cm$^3$ over a frequency of 1 to 8 MHz. At B=10 mT, the power loss increases from 15 to 800 mW/cm$^3$ over a frequency range of 1 to 6 MHz. At a higher flux of B=30 mT, the cores achieved power loss of less than 1000 mW/cm$^3$ when operating frequency is 1-2 MHz. This is a significant improvement over existing and known materials.

Figure 14:
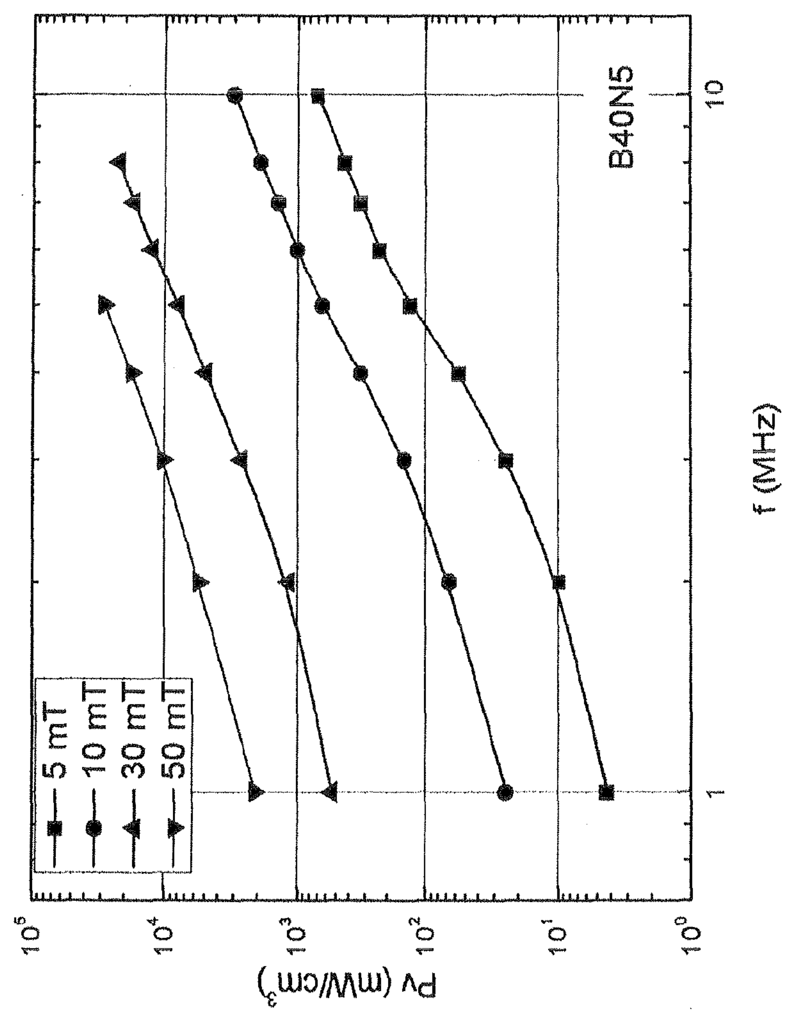
FIG. 14 is a graph depicting test results of power loss as a function of operating frequency for various applied magnetic fields for a sample having a NiZn ferrite nanoparticle concentration of 5 wt-%, according to aspects of the present invention.

FIG. 14 depicts the results of controlled tests on cores made from B40N5 to determine power losses at room temperature. Power loss is less than 400 mW/cm$^3$ at B=5 mT until frequency reaches 8 MHz. At f=1 MHz, the B40N5 cores demonstrate low power loss at $P_v$=4 mW/cm$^3$. Furthermore, this example embodiment presents low power loss even at B=10 mT, yielding $P_v$=20 mW/cm$^3$ at 1 MHz and $P_v$<1000 mW/cm$^3$, until f=6 MHz.

Figure 15:
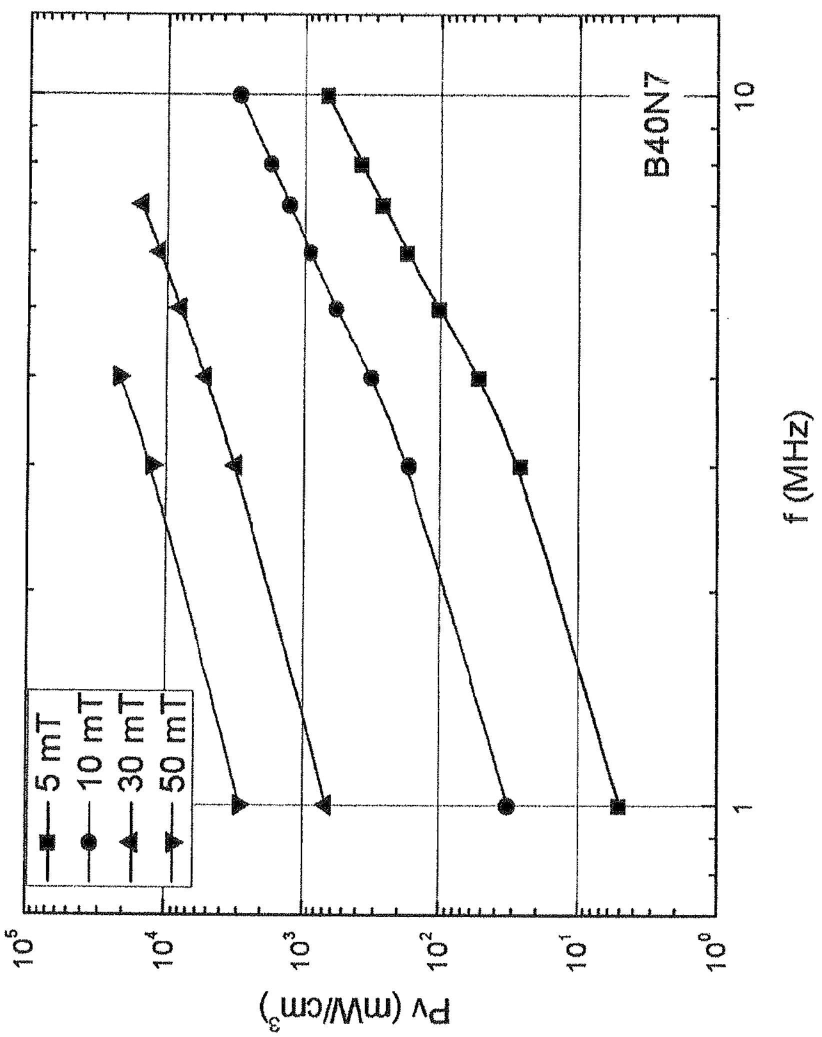
FIG. 15 is a graph depicting test results of power loss as a function of operating frequency for various applied magnetic fields for a sample having a NiZn ferrite nanoparticle concentration of 7 wt-%, according to aspects of the present invention.
Figure 16:
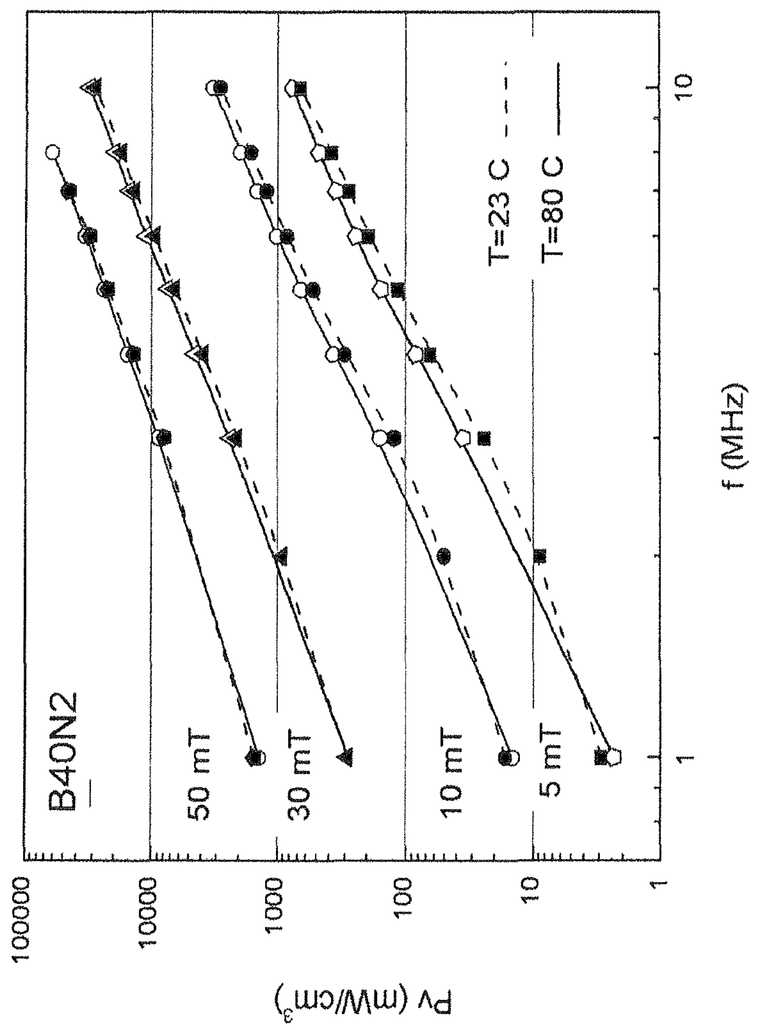
FIG. 16 is a graph depicting test results of power loss as a function of operating frequency for various temperatures, according to aspects of the present invention.

FIG. 15 depicts the results of controlled tests on cores made from B40N7 to determine power losses at room temperature. B40N7 cores show relatively low power losses at low magnetic fluxes. Compared with B40N2 cores (FIG. 13) and B40N5 cores (FIG. 14), the B40N7 cores produced lower power losses at higher frequencies, such as 3-10 MHz, at B=5 or 10 mT. Overall, these results demonstrate the present scientific discovery that operating frequency can be extended significantly when the core retains high permeability, $\mu_i$ of about 300-400. In the example embodiments I-III, this is achieved by providing a composite material made from MnZn ferrite grains and NiZn ferrite nanoparticles at the grain boundaries of the MnZn ferrite grains.

As can be seen from FIGS. 13 through 15, compared with B40N2 and B40N5 cores, the B40N7 core has lower power losses of B=5 or 10 mT at higher frequencies of about 3-10 MHz. One having ordinary skill in the art will readily appreciate that the information contained in the graphs of FIGS. 13 through 15 can be used to select desired relative concentrations of the nanoparticle materials, e.g., for optimizing performance of the resulting core for particular operational situations. As one non-limiting example, cores manufactured according to the illustrative embodiment of the present invention can possess about 7 wt-% of the NiZn ferrite nanoparticles if expected operational frequencies are between about 3-10 MHz.

Additionally, for B40N2 (Example I), high temperature power losses were measured and compared to low temperature losses. A representative sample of the results for B40N2 is presented in FIG. 16, which illustrates power losses both at 23° C. and at 80° C. The data reveals that the high temperature power loss increases by 20% when the frequency is greater than 2 MHz, as compared to the power loss at room temperature. However, at frequencies of below about 2 MHz, the power loss at high temperature is 10-20% lower than that at low temperatures.

As demonstrated by the three examples and by the foregoing description, core components according to the illustrative embodiment exhibit numerous benefits over existing core components. Given the high granularity and the homogeneity of the geometryin polycrystalline structure, the composite material 110 exhibits decreased stress, magnetostriction, and intergranular porosity. This results in reduced hysteretic losses.

Furthermore, the presence of magnetic materials interspersed at the grain boundaries results in Eddy currents being discontinuous across grain boundaries. This greatly reduces Eddy current losses, without causing high current densities and the typical problems associated therewith (e.g., overheating). Furthermore, providing a high cutoff frequency reduces residual loss since the selection of the operating frequency can be far from the peak. This avoids contributions from resonance relaxation associated with reversible domain wall displacement and spin rotation.

Accordingly, given the operational extension of the composite material 110 according to embodiments of the present invention, higher operating frequencies can be achieved while greatly reducing power losses. This enables devices, systems, and electronics implementing the composite material 110 to achieve even smaller and lighter weight specifications, which is highly desirable.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A composite material, comprising:

a grain component having a magnetic ferrite phase; and a nanostructured magnetic grain boundary component that is both magnetic and insulating;

wherein the nanostructured magnetic grain boundary component has a composition that derives from a mixture of powder particles and has a magnetic flux density of greater than about 250 mT.

2. The composite material of claim 1, wherein the nanostructured magnetic grain boundary component has an electrical resistivity of about $10^8$ to $10^{12}$ Ω-cm.

3. The composite material of claim 1, wherein the mixture of powder particles comprises NiZn ferrite nanoparticles comprising a magnetic and insulating ferrite consisting principally of the elements Ni, Zn, Fe, and O.

4. The composite material of claim 1, wherein the grain component comprises a MnZn ferrite material.

5. A method comprising:

producing a composite material by sintering a mixed powder comprising a first particulate component and a second particulate component, the second particulate component comprising particles that are nanosized, magnetic and insulating, wherein a composition of the second particulate component is disposed at grain boundaries of grains comprising a composition of the first component, thereby forming a nanostructured magnetic grain boundary component.

6. The method of claim 5, wherein, in the mixed powder comprising a first particulate component and a second particulate component, the first particulate component can have a particle size of about 0.5-50 microns.

7. The compound material of claim 1, wherein the nanostructured magnetic grain boundary component can have an average size of about 1-100 nm.

8. The composite material of claim 1, wherein the mixed powder comprises a first particulate component and a second particulate component, and wherein the ratio of the second particulate component to the first particulate component can be controlled to between about 1 and 20 weight percent.

9. A core component comprising a composite material, wherein the composite material comprises:

a grain component having a magnetic ferrite phase; and a nanostructured magnetic grain boundary component that is both magnetic and insulating;

wherein the nanostructured magnetic grain boundary component has a composition that derives from a mixture of powder particles and has a magnetic flux density of about 250 mT or greater.

10. The core component of claim 9, wherein the core component is selected from the group consisting of a ferrite toroid, a ferrite plate, a ferrite disk, a ferrite C core, a ferrite CI core, a planar E core, an EC core, a EFD core, an EP core, a ETD core, an ER core, a planar ER core, a U core, a RM/I core, a RM/LP core, a P/I core, a PT core, a PTS core, a PM core, a PQ core, a gaped toroid, a bobbin core, a ferrite E-core, and a ferrite EI-core.

11. The core component of claim 9, wherein the nanostructured magnetic grain boundary component can have an average size of about 1-100 nm.

12. The core component of claim 9, the mixed powder comprises a first particulate component and a second particulate component, and wherein the ratio of the second particulate component to the first particulate component can be controlled to between about 1 and 20 weight percent.

13. The method of claim 5, wherein, in the mixed powder comprising a first particulate component and a second particulate component, the second particulate component can have a particle size of about 1-100 nm.

14. The method of claim 5, wherein in the mixed powder comprising a first particulate component and a second particulate component, the second particulate component comprises NiZn ferrite nanoparticles.

15. The method of claim 5, wherein in the mixed powder comprising a first particulate component and a second particulate component, the first particulate component comprises MnZn ferrite particles.

16. The method of claim 5, further comprising producing the mixed powder, wherein in the mixed powder the first particulate component and the second particulate component have particle sizes obtained via a particle separation technique.

17. The method of claim 5, further comprising adding a binder to the mixture prior to sintering.

18. The method of claim 17, further comprising forming the mixed powder and eliminating the binder by heating.

19. The method of claim 5, wherein prior to sintering, the mixed powder is shaped as a core component selected from the group consisting of a ferrite toroid, a ferrite plate, a ferrite disk, a ferrite E-core, a ferrite EI-core, a ferrite C core, a ferrite CI core, a planar E core, an EC core, a EFD core, a EP core, a ETD core, an ER core, a planar ER core, a U core, a RM/I core, a RM/LP core, a P/I core, a PT core, a PTS core, a PM core, a PQ core, a gaped toroid, and a bobbin core.

20. The method of claim 5, further comprising disposing the composite material in an apparatus selected from the group consisting of a transformer, an electronic device, an inductor, a power electronic device, a power converter, an inductor device, a transmit and receive module (TRM), an Electronically Scanned Phased Arrays (ESPA) system, an Electronic Warfare (EW) system, and a communication device having a SMPS conditioning component.

21. The method of claim 5, wherein, in the mixed powder comprising a first particulate component and a second particulate component, the ratio of the second particulate component to the first particulate component can be controlled within about 1 weight percent.

* * * * *